No. 784,438. PATENTED MAR. 7, 1905.
G. F. SHIELDS.
CURLING IRON.
APPLICATION FILED OCT. 19, 1904.

Witnesses
C. M. Simpson
H. M. Baldwin

Inventor
G. F. Shields
By
Chandlee & Chandlee
Attorneys

No. 784,438. Patented March 7, 1905.

UNITED STATES PATENT OFFICE.

GEORGE F. SHIELDS, OF KERN, CALIFORNIA.

CURLING-IRON.

SPECIFICATION forming part of Letters Patent No. 784,438, dated March 7, 1905.

Application filed October 19, 1904. Serial No. 229,149.

*To all whom it may concern:*

Be it known that I, GEORGE F. SHIELDS, a citizen of the United States, residing at Kern, in the county of Kern, State of California, have invented certain new and useful Improvements in Curling-Irons; and I do hereby declare the following to be a full, clear, and exact description of the invention, such as will enable others skilled in the art to which it appertains to make and use the same.

This invention relates to electric curling-irons, and has for one of its objects to provide an exceedingly simple, inexpensive, durable, and efficient device of the character named.

Another object of the invention resides in the provision of a curling-iron of such character as to obviate the necessity of heating the same over a flame, my improved device being heated by an electric current passed through the hollow tube forming one of the clamping members or jaws.

With these and other objects in view the present invention consists in the combination and arrangement of parts, as will be hereinafter more fully described, shown in the accompanying drawings, and particularly pointed out in the appended claim, it being understood that changes in the form, proportion, size, and minor details may be made within the scope of the claim without departing from the spirit or sacrificing any of the advantages of the present invention.

Figure 1:
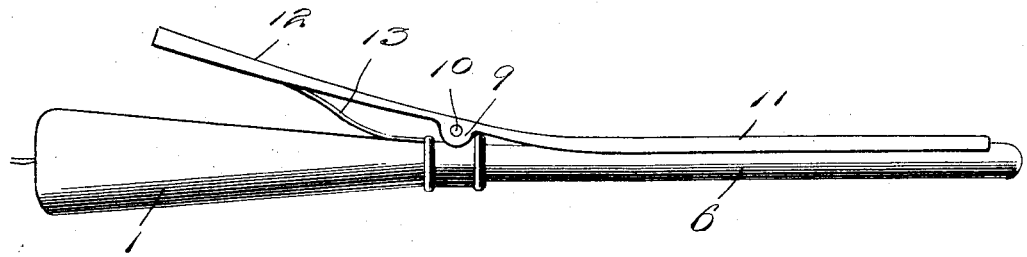
Figure 2:
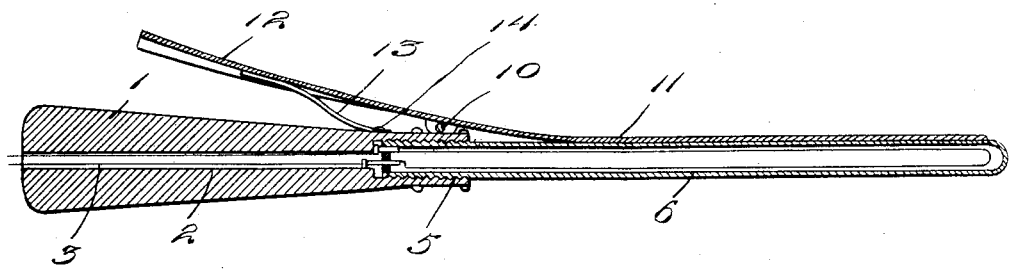

In the drawings, Figure 1 is an elevation of the device. Fig. 2 is a longitudinal sectional view of the same.

Referring now to the drawings, the present curling-iron comprises a handle 1, of suitable non-conducting material and having a central bore 2 and at one end a threaded socket 5, with which the bore communicates. Within the handle are contact-plates 4 and 4', and connected thereto are the lead-in wires 3 and 3', respectively.

A hollow tube 6, preferably of glass, has its ends closed, and one end thereof is exteriorly threaded and removably engaged in the socket 5. Through the threaded end of the tube 6 are engaged contact-pieces 5' and 6', which when the tube 6 is engaged in the socket 5 make contact, respectively, with the plates 4 and 4'. Within the tube 6 and having its ends connected, respectively, with the contact-pieces 5' and 6' is a filament 10' of low conductivity, which is adapted to be rendered incandescent by electric current passing therethrough and fed thereto from the wires 3 and 3'. The filament serves to heat the tube to the proper temperature.

Pivoted within the ears 9 upon the handle 1 by means of a pin or other element 10 is a member or jaw 11. Its handle portion 12 is preferably bent upwardly from the handle 1 and held normally in spaced relation therewith by means of the spring 13, which is secured by means of any suitable fastening—such, for instance, as 14—to the handle 1.

It will now be understood that as soon as the handle and heating-tube are connected together and the current from the battery is turned on electric energy is conveyed through the handle and into the filament 10', thereby heating the latter, so that the tube is heated, and hair or mustache may be clamped and curled therebetween and the member or jaw 11. In other words, the heating-tube performs the double function of heating and serving as a clamping member or jaw, the heating function of the tube obviating the necessity of heating the implement over a flame in the ordinary manner.

It is not absolutely necessary that the heating-tube be formed of glass, for any other appropriate non-conducting material will serve the purpose for which the same is designed. However, glass can be used, and I wish it understood that I may use glass under some or all conditions. If the glass tube is used, it is obvious that a lighting effect will be produced, in which event, even if the room be in total darkness, the implement may be found by reason of the lighting effect, as well as enabling the user to make use of the device in the darkness.

What is claimed is—

In an electric curling-iron, a handle, a hollow glass tube constructed for detachable engagement therewith, the tube serving as a heater and clamping member, a second clamping member pivoted upon the said handle and coöperating with the tube for clamping purposes, and means for establishing electrical communication through the handle and the tube.

In testimony whereof I affix my signature in presence of two witnesses.

GEORGE F. SHIELDS.

Witnesses:
T. V. DOUB,
C. E. GALLANT.